United States Patent [19]

Sampei et al.

[11] Patent Number: 4,984,419
[45] Date of Patent: Jan. 15, 1991

[54] APPARATUS FOR MOUNTING GRASS BOX OF MOWER

[75] Inventors: Keiichi Sampei; Masami Kawasaki, both of Osaka, Japan

[73] Assignee: Kubota, Ltd., Osaka, Japan

[21] Appl. No.: 385,450

[22] Filed: Jul. 27, 1989

[30] Foreign Application Priority Data

Aug. 5, 1988 [JP] Japan ............... 63-104437
Aug. 11, 1988 [JP] Japan ............... 63-106916

[51] Int. Cl.$^5$ .................................. A01D 34/70
[52] U.S. Cl. ....................... 56/202; 56/DIG. 9; 220/324
[58] Field of Search ............ 56/194, 199, 202, 205, 56/206, DIG. 9, 16.6; 220/315, 324, DIG. 21

[56] References Cited

U.S. PATENT DOCUMENTS

| | | | |
|---|---|---|---|
| 3,716,977 | 2/1973 | Jackson | 56/202 |
| 3,934,392 | 1/1976 | Moery et al. | 56/202 |
| 3,971,198 | 7/1976 | Lane | 56/202 |
| 4,156,337 | 5/1979 | Knudson | 56/202 |
| 4,168,600 | 9/1979 | Klug et al. | 56/202 |
| 4,251,982 | 2/1981 | Skaja et al. | 56/202 |
| 4,501,378 | 2/1985 | Berfield | 220/324 |
| 4,522,019 | 6/1985 | Edwards et al. | 56/16.6 |
| 4,570,816 | 2/1986 | Ferris et al. | 220/324 |
| 4,597,203 | 7/1986 | Middleton | 56/16.4 |
| 4,738,088 | 4/1988 | Klever et al. | 56/202 |
| 4,843,805 | 7/1989 | Satoh | 56/202 |
| 4,848,070 | 7/1989 | Berglund | 56/202 |
| 4,907,403 | 3/1990 | Jones | 56/202 |

Primary Examiner—Stephen J. Novosad
Assistant Examiner—Terry L. Melius

[57] ABSTRACT

There is disclosed an apparatus for mounting a grass box of a mower having a machine body, a covered grass box, a mowing unit and a duct through which the grasses mowed by the mowing unit are inputted into the grass box. The apparatus includes a pair of guide rails, laid under the cover, into which the grass box is removably inserted from the rear side. In the mower having the covered grass box disposed below a handle rod, the apparatus further includes stoppers through which the grass box is rotatably removably engaged with the cover and a fixing member for fixing the grass box to the cover in a closed state.

17 Claims, 5 Drawing Sheets

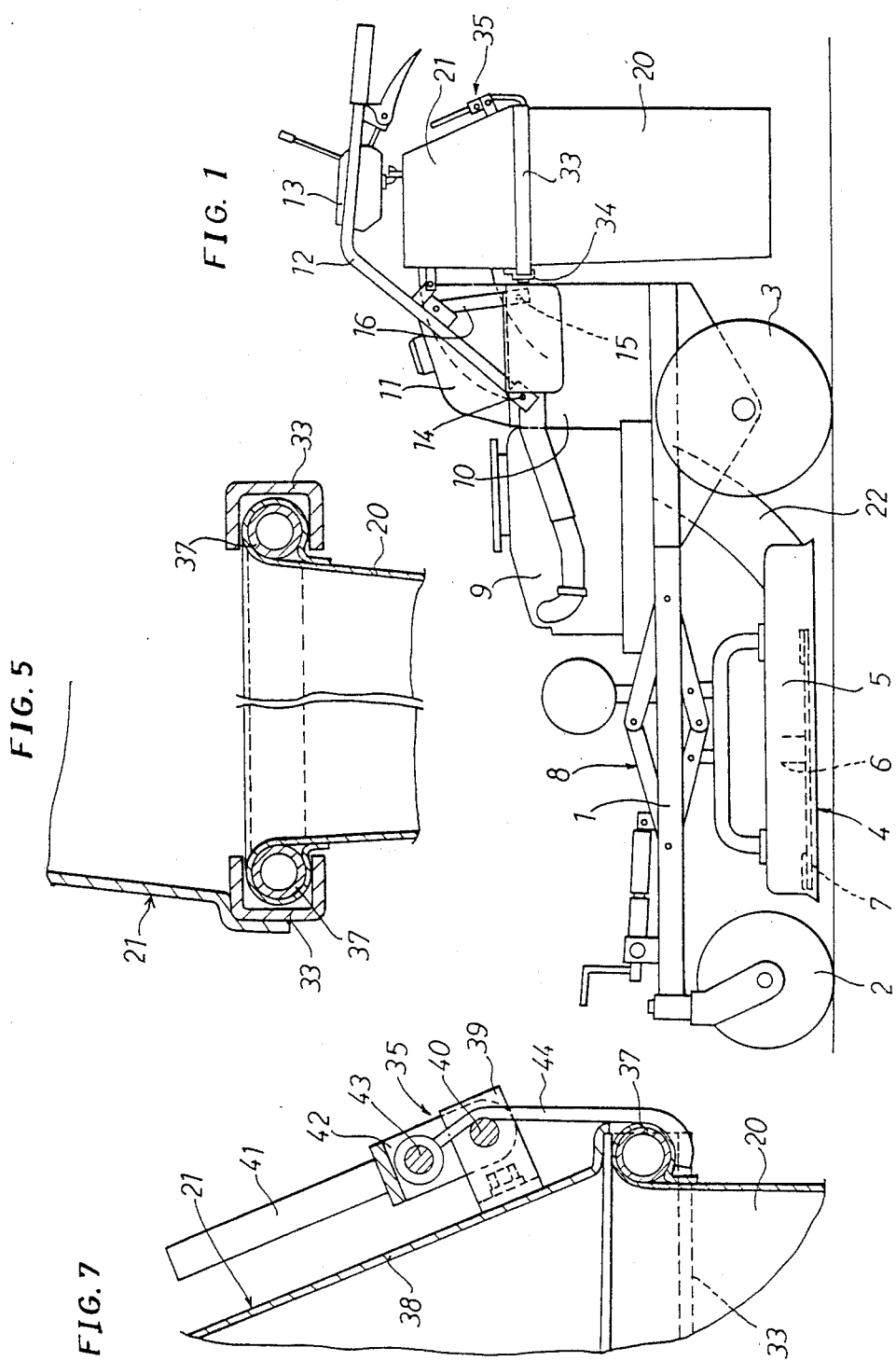

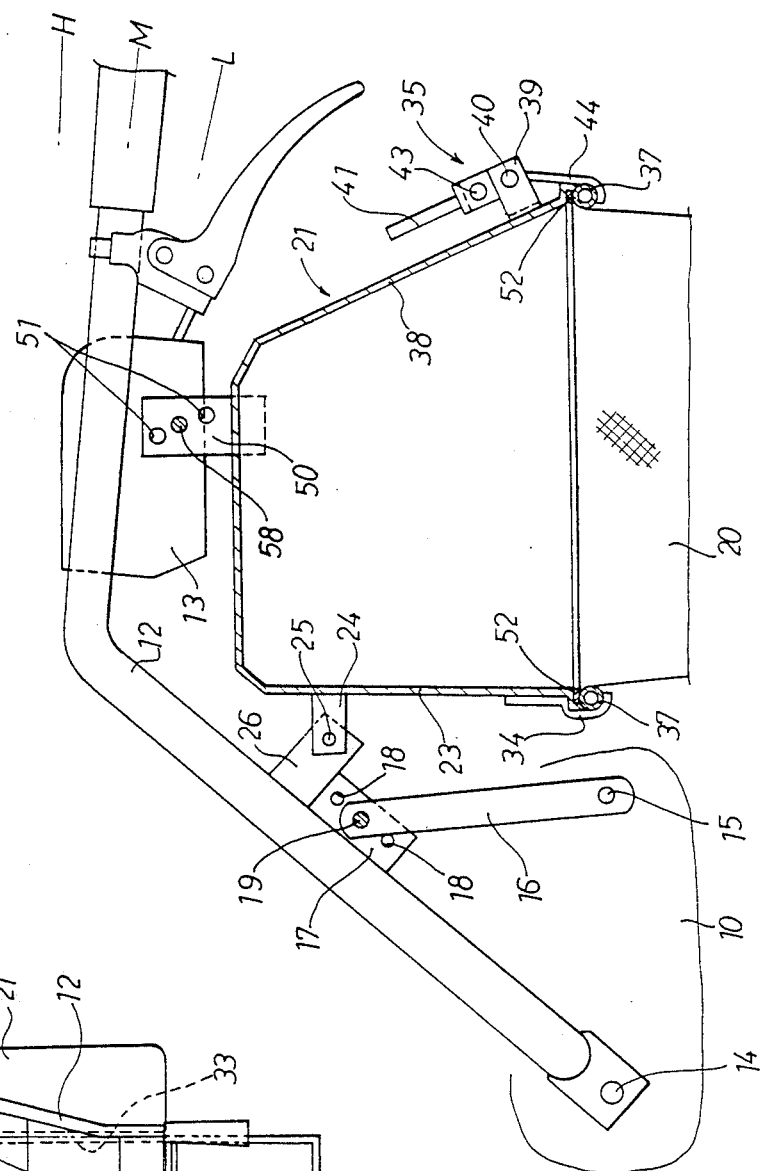
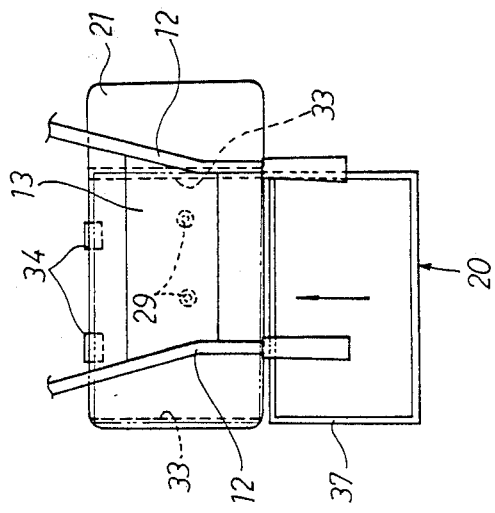

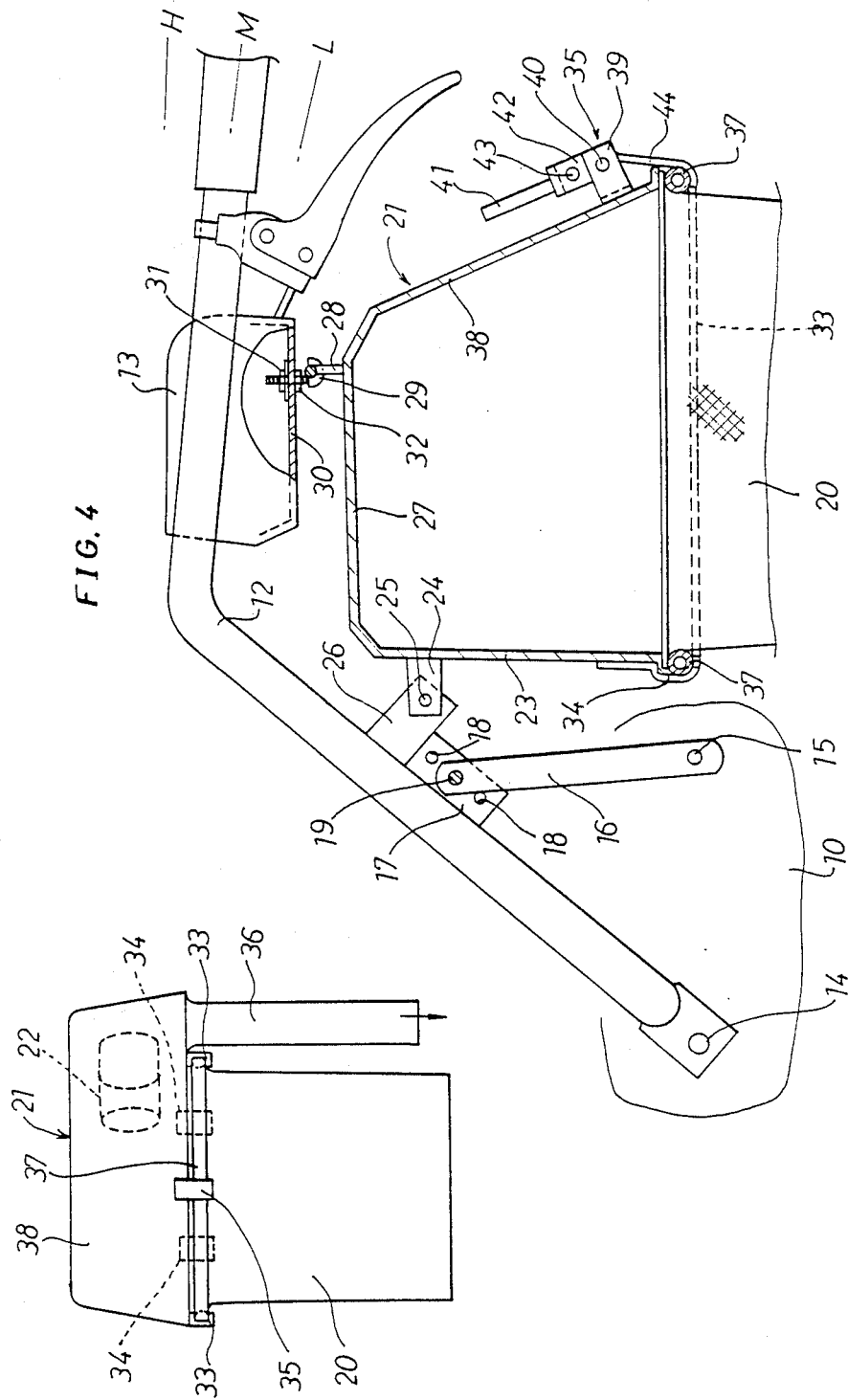

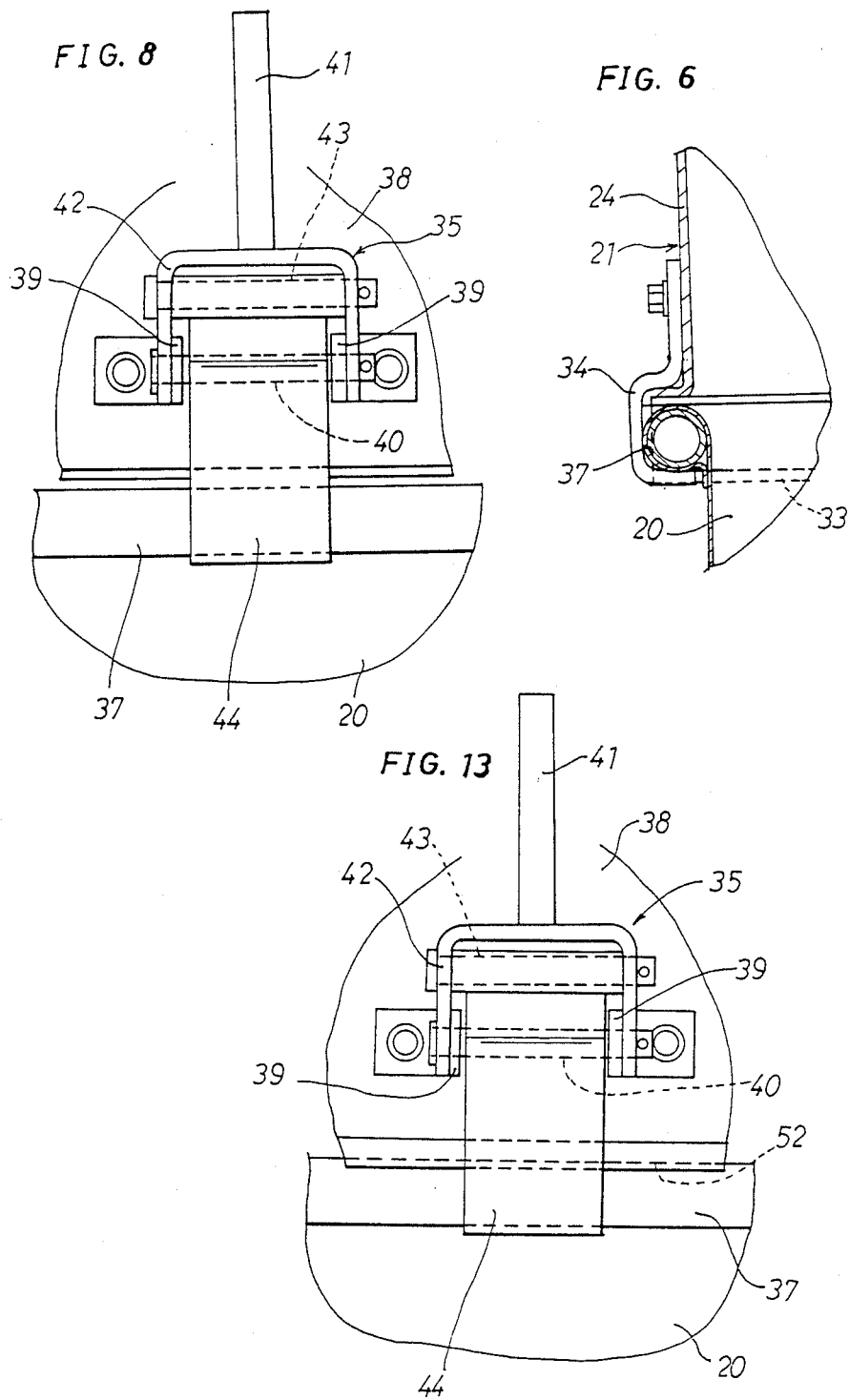

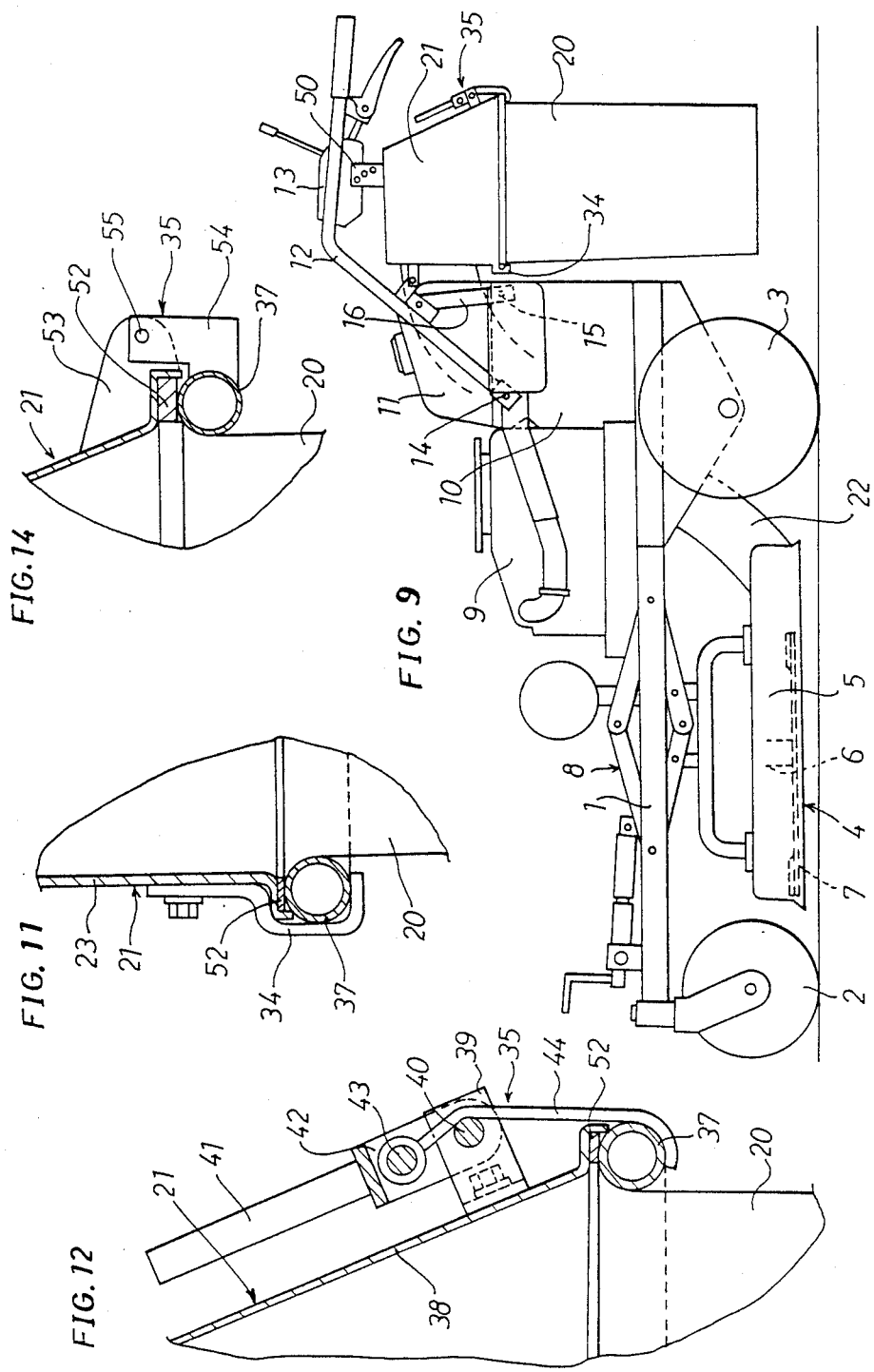

APPARATUS FOR MOUNTING GRASS BOX OF MOWER

FIELD OF THE INVENTION AND RELATED ART STATEMENT

The present invention relates to an apparatus for mounting a grass box of a gait type mower.

Mounted on a rear part of the machine body of the gait type mower is a covered grass box into which the grasses mowed by a mowing unit are thrown via a duct.

This kind of grass box is detachably mounted on the machine body to discharge the grasses accumulated therein. Typical of structure of the conventional grass box, the box is attached or detached together with its cover; or alternatively, the grass box alone is mounted on the machine body or demounted therefrom after opening up the cover.

Hence, there arises a serious drawback to the prior art mounting structure, wherein the operations of mounting and demounting the grass box are quite troublesome, this hindering an improvement in working efficiency.

In some gait type mowers, the grass box is installed downwardly of a handle rod secured to the rear end of the machine body.

Based on this remarkably convenient arrangement, the grass box does not become a hindrance when maneuvered into a narrow place to mow the grasses there, because the entire width thereof can be restrained smaller than in a structure of mounting the box on a side portion of the machine body.

This arrangement is, however, attended with the following defect. When the grass box is installed under the handle rod, the rod hinders the cover from being opened and closed on the upper side, thereby making it troublesome to take the grasses out of the grass box.

OBJECTS AND SUMMARY OF THE INVENTION

It is a first object of the present invention overcome the foregoing problems inherent in the prior art by providing an apparatus for mounting a grass box of a mower, the apparatus being capable of readily mounting and demounting a grass box in a state where the machine body remains fitted with a cover.

It is a second object of the invention to provide an apparatus for mounting a grass box of a mower, the apparatus being capable of readily attaching the grass box to the cover and detaching it therefrom in a state where the cover remains fixed to a handle rod of the machine body.

Means for accomplishing these objects are constructed as follows.

In a mower comprising a grass box 20, disposed in the rear of a machine body 1 and fitted with a cover 21, into which the grasses mowed by a mowing unit 4 are thrown via a duct 22, there is provided a first means characterized in that machine body 1 is mounted with cover 21 under which a pair of right and left guide rails 33 are laid to and fro, and grass box 20 is removably inserted in guide rails 33 from the rear side.

In a mower comprising grass box 20 including cover 21 provided downwardly of a handle rod 12, there is provided a second means characterized in that cover 21 is fitted to handle rod 12, grass box 20 rotatably engages with cover 21 through stoppers 34 as to be capable of disengaging therefrom, and a fixing member 35 for fixing grass box 20 to cover 21 in a closed state.

BRIEF DESCRIPTION OF THE DRAWINGS

Other objects and advantages of the invention will become apparent during the following discussion in conjunction with the accompanying drawings, in which:

FIGS. 1 through 8 in combination show a first embodiment of present invention.

FIG. 1 is a side view illustrating a mower as a whole;

FIG. 2 is a plan view of a grass box;

FIG. 3 is a rear view thereof;

FIG. 4 is a side view in section illustrating the principal portion;

FIG. 5 is a sectional view depicting guide rails;

FIG. 6 is a sectional view illustrating a stopper;

FIG. 7 is a sectional view illustrating a clamp member;

FIG. 8 is a rear view thereof;

FIGS. 9 through 13 in combination show a second embodiment of the present invention.

FIG. 9 is a side view depicting a mower as a whole;

FIG. 10 is a side view in section illustrating the principal portion;

FIG. 11 is a sectional view illustrating a stopper;

FIG. 12 is a sectional view illustrating a fixing member;

FIG. 13 is a rear view thereof; and

FIG. 14 is a sectional view of the fixing member, showing a third embodiment of the present invention.

DETAILED DESCRIPTION OF THE PREFERRED EMBODIMENTS

Illustrative preferred embodiments of the present invention will hereinafter be described in detail.

FIGS. 1 through 8 in combination show a first embodiment of the present invention.

Referring first to FIGS. 1 through 3, a machine body generally designated at 1 is equipped with a pair of right and left caster wheels 2 disposed at the front of the machine body and a pair of right and left driving wheels 3 disposed at the rear of the machine body. The numeral 4 denotes a mowing unit formed with mowing blades 7 which rotate about a vertical shaft 6, the blades being provided below of a deck 5. Mowing unit 4 is supportably suspended from machine body 1 through a pantagraph type link mechanism 8 so that the unit is able to adjust a mowing height. An engine 9 and a mission case 10 are loaded on the rear part of machine body 1. Mowing blades 7 and driving wheels 3 are driven by power imparted from engine 9 via unillustrated belt transmission mechanisms as well as via a variable speed gear accommodated in mission case 10. A fuel tank 11 is loaded on mission case 10.

The numeral 12 represents a handle rod extending upwards and rearward from the top of mission case 10. A pair of right and left handle rods 12 are connected together at their mid-portions by means of an operation panel 13. A front end of each handle rod 12 is pivotally supported through a pin 14 on the upper front end of mission case 10 so that handle rod 12 is turnable up and down. Handle rod 12 is also fixed so as to be adjustable up and down by means of a link 16 pivotally secured through a pin 15 to the upper rear end of mission case 10. More specifically, as illustrated in FIG. 4, a bracket 17 is fixedly provided to handle rod 12 in a position corresponding to link 16. Bracket 17 is perforated with a plurality of adjustment holes 18 arranged along handle rod 12. Inserted in one of adjustment holes 18 is a bolt 19, thus fixing link 16. Handle rod 12 is adjustable from, e.g., a middle position M to higher and lower positions H and L by selecting adjustment holes 18.

The reference numeral 20 designates a grass box for containing the grasses. Grass box 20 has a cover 21 installed under handle rod 12 in close proximity to the rear part of machine body 1. The grasses mowed by a mowing unit 4 are inputted from cover 21 via a duct 22 into grass box 20. Cover 21 is, as depicted in FIG. 4, pivotally detachably fitted to brackets 26 of handle rods 12 through a pair of right and left brackets 24 protruding forwards from a front face plate 23 as well as through headed pins 25 removably inserted in brackets 24. Cover 21 is further detachably hooked by hook bolts 29 of operation panel 13 through inverted U-shaped hook members 28 protruding upwards from an upper face plate 27. A pair of hook members 28 and a pair of hook bolts 29 are bilaterally provided, the hook bolts being screwed in nuts 31 fixed to a bottom plate 30 of operation panel 13 and fastened with lock nuts 32.

A lower part of cover 21 is formed open. Grass box 20 is removably mounted on the lower portion of cover 21 through a pair of guide rails 33, stoppers 34 and a clamp type fixing member 35; and a discharge duct 36 is also installed therein. Grass box 20 is formed of punching metal, a net or a canvas. Provided at an upper open edge of grass box 20 is a frame body 37 assuming, as depicted in FIGS. 2 and 4, a rectangular configuration. The pair of right and left guide rails 33, which are composed of, as illustrated in FIG. 5, channel members formed to open inwardly, are secured to the lower portion of cover 21 in the to-and-fro directions. Guide rails 33 are adapted to supportably guide the bilateral parts of frame body 37 of grass box 20, whereby frame body 37 is slidable back and forth. Frame body 37 of grass box 20 is removably inserted in the pair of right and left guide rails 33 from the rear side.

Stoppers 34 function to stop the front part of frame body 37 to prevent frame body 37 from being lowered when installing grass box 20 so that the upper end opening is, as illustrated in FIG. 6, blocked by cover 21. The pair of stoppers 34 are bilaterally provided on a front face 23 of cover 21. Note that stoppers 34 may be disposed inwardly or outwardly of front face plate 23.

Fixing member 35 is intended to fix frame body 37 by pulling up the rear part thereof when installing grass box 20. Fixing member 35, as depicted in FIGS. 7 and 8, consists of a lever 41 so pivotally secured through a pin 40 to bracket 38 fixed to the lower part of a rear face plate 38 of cover 21 as to be rotatable up and down, and of a hook 44 pivotally secured through a pin 43 to a forked member 42 on the proximal side of lever 41, the hook being capable of engaging with and disengaging from the rear part of frame body 37 of grass box 20. It is to be noted that a pair of fixing members 35 may bilaterally be disposed; or alternatively a single piece of fixing member 35 may be provided at the central portion. Cover 21 is also fitted with a sealing member (not illustrated) such as a sponge to blockade a gap between frame body 37 and the cover itself when fixing grass box 20 with fixing member 35.

In the grass mowing operation, grass box 20 is fixed to cover 21, and the grasses mowed by mowing unit 4 are thrown from cover 21 via duct 22 into grass box 20 and accumulated therein. In this case, the bilateral parts of frame body 37 within grass box 20 are supportably set in guide rails 33, while the front part thereof is stopped by the pair of right and left stoppers 34. In addition, the rear part of frame body 37 is raised by fixing member 35, with the result that frame body 37 is never deflected by a weight of the grasses in the grass box 20.

Discharge of the grasses from grass box 20 involves the steps of disengaging hook 44 downwards from frame body 37 by turning lever 41 of fixing member 35 backwards about pin 40 and pulling out grass box 20 backwards along guide rails 33 after moving up hook 44. At this time, the weight of grass box 20 is sustained by guide rails 33, and hence there is no necessity for the operator to hold grass box 20 itself. The grass box can readily be pulled out backwards. Subsequently, after grass box 20 has sufficiently been moved back, the operator may remove the grass box from guide rails 33 while holding it. Grass box 20 alone can thus be demounted with facility while cover 21 remains fixed to machine body 1.

In the case of installing grass box 20, the bilateral parts of frame body 37 are set in the pair of right and left guide rails 33, and thereafter grass box 20 is pushed forwards from the back side. Then frame body 37 slides on guide rails 33. When reaching the front ends of guide rails 33, the front part of frame body 37 is blocked by stoppers 34. Next, after the rear part of frame body 37 has been hooked by hook 44 of fixing member 35, lever 41 is turned upwards, thus performing the fixation. As a result, frame body 37 is press-fitted to guide rails 33 from underneath and further press-fitted to stopper 34 from the rear side, whereby grass box 20 is not allowed to move.

If grass box 20 is removed, hook members 28 are released from hook bolts 29, and headed pins 25 are pulled out, with the result that grass box 20 can be removed together with cover 21. Hook bolts are taken out of nuts 31 by slackening lock nuts 32. This arrangement does not spoil the external appearance at all.

In this way, the pair of right and left guide rails 33 are laid in the to-and-fro directions under cover 21 mounted on machine body 1. Grass box 20 is removably inserted in guide rails 33 from the rear side. With this arrangement, only grass box 20 can easily be mounted and demounted while cover 21 remains secured to machine body 1. The working efficiency is remarkably improved as compared with the prior art.

Stoppers 34 may assume a similar configuration in section to that of guide rails 33 and may also be formed long in the right and left directions. Instead of fixing member 35, a hook may be provided on cover 21, thereby preventing the removal of frame body 37; or a stopper pin for preventing the removal may also be provided.

The description will next deal with a second illustrative embodiment of the present invention in conjunction with FIGS. 9 through 13.

Referring to FIGS. 9 and 10, cover 21 is pivotally secured to a pair of right and left brackets 24 each protruding forwards from front face plate 23 and also to brackets 26 of handle rod 12 through pins 25 inserted into brackets 24. Cover 21 is also fitted to brackets 50 projecting upwards from both sides as well as to the bilateral parts of operation panel 13 on the side of handle rod 12 so that cover 21 is adjustable up and down by employing a bolt 58 inserted into one of a plurality of adjustments holes 51 perforated in brackets 50. The plurality of adjustment holes 51 formed on the periphery about pin 25 serve to adjust grass box 20 to assume a substantially perpendicular posture when vertically adjusting handle rod 12.

Grass box 20 including a rectangular frame body 37 at its upper end open edge is detachably fitted to cover 21 through fixing member 35 and stoppers 34 which respectively engage with the front and rear parts of frame body 37. Namely, the front part of frame body 37 is releasably seized from the rear side by the pair of right and left stoppers 34 provided at lower portion of front face plate 23 of cover 21. Hence, grass box 20 is capable of engaging with and disengaging from stoppers 34 and is also rotatable up and down about stoppers 34 each serving as a fulcrum. Fixing member 35 acts to fix grass box 20 to cover 21. This involves the steps of engaging frame body 37 with stoppers 34, subsequently causing the rear part of frame body 37 to be removably hooked by hook 44 from the back side, and finally pulling it up. A pair of fixing members 35 may be provided bilaterally; or alternatively a single piece of fixing member 35 may be provided at the central portion. Fitted through an inner periphery at the lower edge of cover 21, as illustrated in FIGS. 11 to 13, is a sealing member 52 such as a sponge or the like with the intention of permitting the press-fit of frame body 37 from below when fixing grass box 20 in a closed state with fixing member 35.

On the occasion of the grass mowing operation, grass box 20 is fixed to cover 21 with stoppers 34 as well as with fixing member 35. Then, the grasses mowed by mowing unit 4 are inputted from cover 21 via duct 22 into grass box 20 and accumulated therein.

When taking the grasses out of grass box 20, lever 41 of fixing member 35 is turned backwards about pin 40, and it follows that hook 44 is lowered while the hook remains engaged with frame body 37. As a result, grass box 20 is turned downwards with stoppers 34 each serving as the fulcrum. Subsequent to this step, hook 44 is released from frame body 37, and grass box 20 is pulled back, whereby the front part of frame body 37 is immediately disengaged from stoppers 34. It is therefore possible to separate and remove grass box 20 from cover 21 while cover 21 remains fitted to handle rod 12. This arrangement facilitates the discharge of the grasses from grass box 20.

When mounting grass box 20, frame body 37 is at first engaged with stoppers 34, and subsequently the rear part of frame box 20 is raised with stoppers 34 serving as the fulcrums. After frame box 37 has been hooked by hook 44 of fixing member 35, lever 41 is turned upwards. Then lever 41 stops in such a position as to exceed a dead point, and frame body 37 is thereby press-fitted to sealing member 52, resulting in the fixation of grass box 20 to cover 21 in the closed state.

Note that fixing member 35 is not limited to a clamp type member. The alternatives to fixing member 35 are, as in a third embodiment shown in, e.g., FIG. 14, an arrangement wherein cover 21 and frame body 37 are individually provided with brackets 53 and 54 into which pins 55 are inserted, and an arrangement wherein cover 21 is pivotally fitted with a hook capable of engaging with frame body 37 and disengaging therefrom.

In this manner, cover 21 is fitted to handle rod 12; and grass box 20 is rotatably detachably attached through stoppers 34 to cover 21. There is further provided fixing member 35 for fixing grass box 20 to cover 21 in the closed state. Based on this arrangement, grass box 20 can be opened and closed while cover 21 remains fitted to handle rod 12. Hence, the grasses can be taken out of grass box 20 more easily than in the prior art.

Although the illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What is claimed is:

1. In a mower, comprising:
   a machine body;
   a grass box disposed in rear of said machine body;
   a cover fitted to said grass box;
   a mowing unit mounted to said machine body for mowing grass;
   a duct through which the mowed grass is thrown into said grass box; and
   an apparatus for mounting a grass box of said mower, characterized in that said machine body is fitted with said cover and a pair of right and left guide rails laid to and fro under said cover, said pair of guide rails having open channels thereof formed inwardly, and said grass box is removably inserted on said guide rails from the rear side, wherein an upper end open edge of said grass box is provided with a rectangular frame body, opposing bilateral parts of which are slidable on said guide rails.

2. The apparatus as set forth in claim 1, wherein a handle rod protruding backwards is secured to a rear end of said machine body, and said cover is fixedly suspended from the lower part of said handle rod so that said grass box is disposed in the vicinity of the rear part of said machine body.

3. The apparatus as set forth in claim 1, wherein a front end lower part of said cover is provided with stoppers for stopping an upper front end of said grass box interposed between said pair of right and left guide rails to prevent said grass box from being lowered.

4. The apparatus as set forth in claim 1, wherein a rear end of said cover is provided with a clamp member for pulling up and fixing an upper rear end of said grass box interposed between said pair of right and left guide rails.

5. The apparatus as set forth in claim 1 or 4, further including a clamp member disposed centrally between said pair of right and left guide rails.

6. The apparatus as set forth in claim 1 or 2, wherein said cover is detachably attached to a handle rod.

7. A mower comprising:
   a machine body;
   a handle rod disposed to a rear of said machine body;
   a grass box disposed under said handle rod;
   a cover removably fitted to said grass box and secured in a stationary position to said handle rod, said cover having at least front and rear edges formed therewith;
   a mowing unit mounted to said machine body for clipping grass;
   means for transferring clipped grass from said mowing unit to said grass box;
   means for mounting said grass box to said cover wherein said grass box is rotatably removably engaged with the front edge of said cover; and
   means for fixing said grass box to the rear edge of said cover in a closed state.

8. The apparatus as set forth in claim 7, wherein said means for mounting includes stoppers provided at the front edge of said cover.

9. The apparatus as set forth in claim 8, wherein an upper open end of said grass box is formed of a rectangular frame body, said rectangular frame body having front rear and side portions, wherein a front portion of said frame body is detachably engaged with said stoppers from the rear side of said mower.

10. The apparatus as set forth in claim 7, further including a hook on said fixing member releasably engaged with a rear portion of said frame body.

11. The apparatus as set forth in claim 7, 8 or 10, wherein said frame body assuming the rectangular shape is provided at the upper end open edge of said grass box, and said hook of said fixing member is releasably engaged from the back side with a rear part of said frame body.

12. The apparatus as set forth in claim 7, wherein an angle of said handle rod is adjustable up and down with respect to said machine body, while an angle of said cover is adjustable up and down with respect to said handle rod.

13. An apparatus for mounting a grass catcher to a mower comprising:
   at least one handle member fixed at a first end thereof to said mower;
   a cover member removably mounted to said grass catcher, said cover member including front, top and rear faces;
   first mounting means for mounting the front face of said cover member to said at least one handle member;
   second mounting means for mounting the top face of said cover member to said at least one handle member;
   a support frame integrally connected with an upper perimeter of said grass catcher, said support frame being sealingly engagable with said cover member;
   means for pivotably connecting a lower edge of the front face of said cover member with a corresponding front portion of said support frame; and
   means for removably securing a rear portion of said support frame to a corresponding lower edge of the rear face of said cover member;
   wherein said grass catcher is pivotable about said means for pivotably connecting toward the mower upon release of said means for removably securing, thereby enabling removal of and access to contents of the grass catcher from the rear of the mower while said cover member remains in a fixed position.

14. The apparatus according to claim 13, wherein said first mounting means includes a pair of bracket members, one of said bracket members being fixed to a front plate of said cover and the other of said bracket members being fixed to said at least one handle member, said first and second brackets being fixed with respect to each other at a predetermined angle.

15. The apparatus according to claim 13, wherein said second mounting means includes a hook member releasably engagable with a hook bolt suspended from said at least one handle member.

16. The apparatus according to claim 13, wherein said means for pivotably connecting includes stoppers mounted at a lower edge of the front face of said cover member, said stoppers having a curved shape following a contour of said support frame, whereby said support frame pivots within a curved shape of said stoppers.

17. The apparatus according to claim 13, wherein said means for removably securing includes a clamp member fixed to the rear face of said cover member and having a hook depending therefrom for engaging with said support frame and lifting said support frame into engagement with said cover member upon closing of said clamp.

* * * * *